United States Patent
Lore et al.

(10) Patent No.: US 8,529,196 B2
(45) Date of Patent: Sep. 10, 2013

(54) NACELLE EQUIPPED WITH AT LEAST ONE EXCESS PRESSURE FLAP

(75) Inventors: Xavier Raymond Yves Lore, Beuzeville la Grenier (FR); Pascal-Marie Paul Marcel Soulier, Le Havre (FR); Aurélie De Sorbay, Le Havre (FR); Thierry Jacques Albert Le Docte, Le Havre (FR)

(73) Assignee: Aircelle, Gonfreville L'Orcher (FR)

( * ) Notice: Subject to any disclaimer, the term of this patent is extended or adjusted under 35 U.S.C. 154(b) by 874 days.

(21) Appl. No.: 12/674,200

(22) PCT Filed: Aug. 5, 2008

(86) PCT No.: PCT/EP2008/060284
§ 371 (c)(1),
(2), (4) Date: Feb. 19, 2010

(87) PCT Pub. No.: WO2009/024461
PCT Pub. Date: Feb. 26, 2009

(65) Prior Publication Data
US 2011/0262270 A1 Oct. 27, 2011

(30) Foreign Application Priority Data
Aug. 20, 2007 (FR) ..................... 07 05936

(51) Int. Cl.
*F01D 25/28* (2006.01)

(52) U.S. Cl.
USPC ............... 415/118; 415/126; 415/144

(58) Field of Classification Search
USPC .............. 415/26, 28, 47, 118, 126, 144, 145, 415/213.1; 60/223, 39.091, 779, 39.1, 226.1, 60/797, 798; 239/265.25, 265.27
See application file for complete search history.

(56) References Cited

U.S. PATENT DOCUMENTS
4,825,644 A 5/1989 Bubello et al.
2011/0171014 A1* 7/2011 Lore et al. ................. 415/182.1

FOREIGN PATENT DOCUMENTS
FR 2406729 5/1979

OTHER PUBLICATIONS
International Search Report; PCT/EP2008/060284; Sep. 16, 2008.

* cited by examiner

*Primary Examiner* — Edward Look
*Assistant Examiner* — Jesse Prager
(74) *Attorney, Agent, or Firm* — Brinks Hofer Gilson & Lione

(57) ABSTRACT

The present invention relates to a jet engine nacelle (1), of the type comprising an aft section forming an external structure (2) which, together with a concentric internal structure (4) comprising an internal panel (10) intended to surround a down-stream portion of the jet engine, defines an annular flow duct for a so-called secondary stream (3), characterized in that exhaust means (11) are formed in the internal panel such that any unwanted excess pressure is discharged into the annular duct.

7 Claims, 3 Drawing Sheets

NACELLE EQUIPPED WITH AT LEAST ONE EXCESS PRESSURE FLAP

TECHNICAL FIELD

The disclosure relates to a jet engine nacelle for an aircraft.

BACKGROUND

An aircraft is propelled by a number of jet engines each housed in a nacelle which also accommodates a collection of auxiliary actuating devices associated with the operation thereof and performing various functions when the jet engine is operating or stationary. These auxiliary actuating devices particularly comprise a mechanical system for actuating thrust reversers.

A nacelle generally has a tubular structure comprising an air inlet in front of the jet engine, a mid-section intended to surround a fan of the jet engine, and a rear section accommodating thrust reversal means and intended to surround the combustion chamber of the jet engine, and is generally terminated by an exhaust nozzle whose outlet is situated downstream of the jet engine.

Modern nacelles are often intended to accommodate a turbofan jet engine designed, via the blades of the rotating fan, to generate a hot air stream (also known as primary stream) from the jet engine combustion chamber.

A nacelle generally has an outer structure, termed Outer Fixed Structure (OFS), which, together with a concentric inner structure, termed Inner Fixed Structure (IFS), comprising an inner panel surrounding the actual structure of the jet engine to the rear of the fan, defines an annular flow duct, also termed flow path, aimed at channeling a cold air stream termed secondary steam, which flows around outside the jet engine. The primary and secondary streams are ejected from the jet engine via the rear of the nacelle.

Certain equipment of the jet engine conduct highly pressurized fluids. In the event of untimely breakage of this equipment, the inner panel is subjected to a high excess pressure which can lead as far as the destruction of a part of said panel and/or of the equipment housed in this environment. To avoid this destruction, it is commonly accepted to install one or more excess pressure flaps in the rear part of the inner panel of the outer structure, at the outlet of the annular duct, the gas flow rate constituting the excess pressure then being theoretically discharged directly to the outside of the nacelle.

Nevertheless, the gas flow rate generated by the explosion produced in the jet engine compartment can be expelled only after having travelled the whole way to the nearest excess pressure flap. Now, it has been found in practice that this distance had the effect of greatly limiting the benefit of integrating such excess pressure flaps, insofar as the structure and/or the equipment could suffer before the excess pressure is discharged. In certain cases, it has even been found that these excess pressure flaps did not play any role.

It is known from document U.S. Pat. No. 4,825,644 to form exhaust means in the inner panel, these exhaust means comprising at least one excess pressure flap equipped with spacing means for ensuring a minimum discharge flow rate to the outside in the event of untimely excess pressure, said spacing means being produced with the aid of at least one strut equipped with locking means designed to lock said strut in its spacing position in the event of excess pressure requiring the opening of the excess pressure flap. Consequently, the untimely excess pressure occurring in the jet engine compartment is immediately discharged inside the annular duct via the exhaust means, and cannot therefore cause the destruction of the inner panel and/or the surrounding equipment.

BRIEF SUMMARY

The disclosure aims at providing an alternative solution and to that end comprises a nacelle for a jet engine, of the type comprising a rear section made up of an outer structure which, together with a concentric inner structure comprising an inner panel intended to surround a downstream portion of the jet engine, defines an annular flow duct for a so-called secondary stream, said nacelle comprising exhaust means formed in the inner panel and comprising at least one excess pressure flap equipped with spacing means for guaranteeing a minimum discharge flow rate to the outside in the event of an untimely excess pressure, said spacing means being produced with the aid of at least one strut equipped with locking means designed to lock said strut in its spacing position in the event of excess pressure requiring the opening of the excess pressure flap, characterized in that the strut comprises a hollow casing in which a rod can slide, said casing having an end fixed in the excess pressure flap and said rod having an end fixed in the inner panel, and in that the locking means are produced with the aid, on the one hand, of a locking finger housed in the casing and having a first end mounted pivotably about an axis in the region of the end of the casing fixed in the excess pressure flap and a second end housed in a cavity formed in the rod, and, on the other hand, elastic return means designed so as to longitudinally off-center said locking finger with respect to the cavity of the rod when said rod has slid in the casing, thus preventing its rearward return.

Advantageously, the exhaust means are positioned at the front of the inner panel.

It should go without saying that another solution for overcoming the potential risk of reclosure can also exist in the integration of means for braking the reclosure movement of the excess pressure flap, such that the latter can find its point of equilibrium.

Thus, in a nacelle according to this disclsoure, the location of the excess pressure flap or flaps can be chosen to be as close as possible to the equipment of the jet engine which is likely to create the highest excess pressure, such that this or these excess pressure flap or flaps are capable of discharging this excess pressure without stressing the stiffness of the inner panel of the inner structure.

Specifically, to the disclosure seeks benefit from the very high local excess pressure in the vicinity of the point of the explosion in order to promote the immediate opening of the exhaust means, thereby finally allowing a quasi-instantaneous expulsion of the gases generated by the explosion. The risk of damaging the inner panel and/or the surrounding equipment is therefore considerably reduced.

The immediate advantages of such an installation are a weight and cost saving since, given that the inner panel of the inner structure is no longer stressed by any untimely excess pressure, there is no longer any need to dimension it so that it can withstand such stresses. Furthermore, aircraft manufacturers have more freedom as to the choice of the location of the excess pressure flap or flaps along the annular duct.

Given the position of these exhaust means, a nacelle according to an exemplary embodiment comprises detection means designed so as to make the actuation of the exhaust means visible from the outside.

Advantageously, the detection means comprise a control system whose activation is conditioned by the activation of the exhaust means.

More advantageously still, the control system is connected to at least one external mechanical display member via transmission means.

In an exemplary embodiment, the control system comprises a prestress trigger, connected to the transmission means, the release of which is conditioned by the actuation of the exhaust means.

The disclosure also relates to an aircraft comprising at least one nacelle according to an exemplary embodiment.

BRIEF DESCRIPTION OF THE DRAWINGS

Implementation will be better understood from the detailed description which is explained below with reference to the appended drawing, in which.

DETAILED DESCRIPTION

Figure 1:
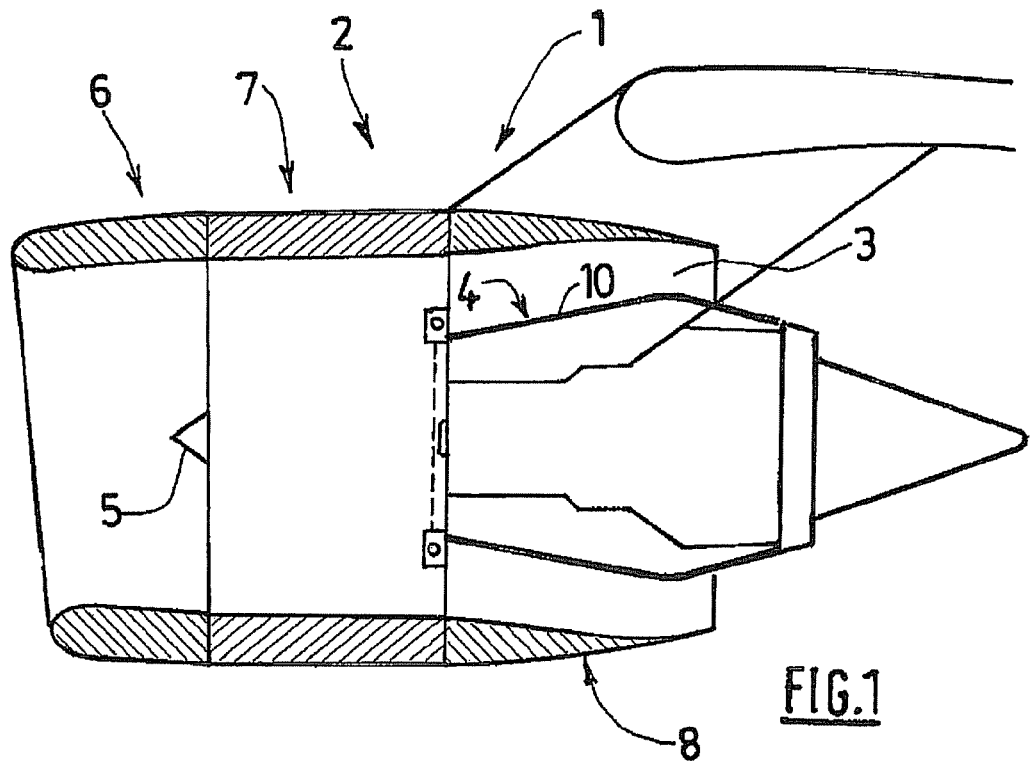
FIG. 1 is a schematic view in longitudinal section of a nacelle according to an exemplary embodiment in the closed state.

A nacelle of an aircraft 1 according to an exemplary embodiment as represented in FIG. 1, comprises in a manner known per se an outer structure 2, termed OFS, which defines an annular flow duct 3 with a concentric inner structure 4, termed IFS, surrounding the structure of the jet engine (not shown) to the rear of a fan 5.

More precisely, this outer structure 2 is broken down into a front air inlet section 6, a mid-section 7 intended to surround the fan 5, and a rear section 8 generally formed by at least two half-shells.

Figure 2:
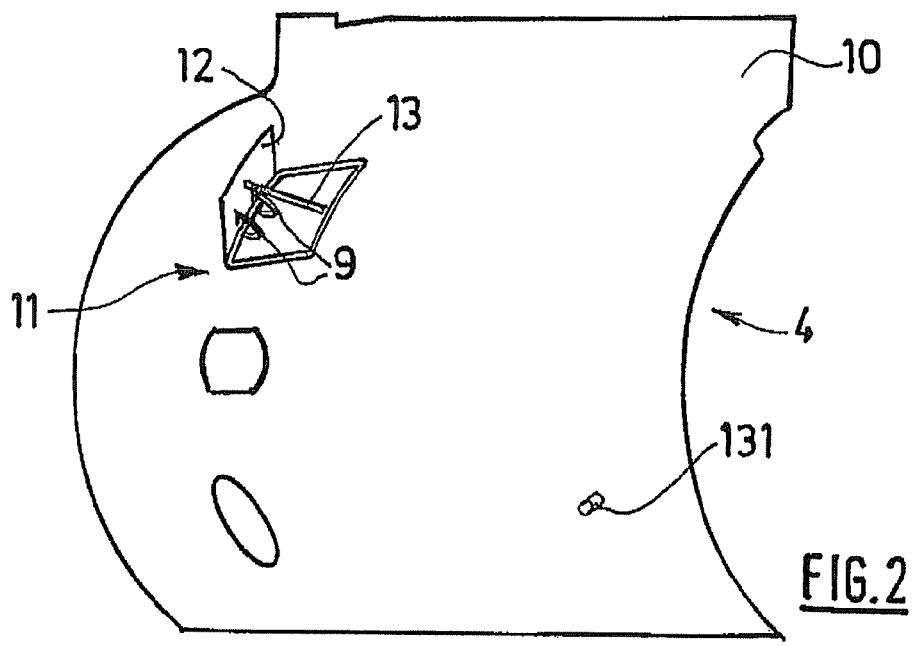
FIGS. 2 and 3 are partial perspective schematic views of the inner panel of a nacelle according to an exemplary embodiment when the excess pressure flap is deployed.
Figure 3:
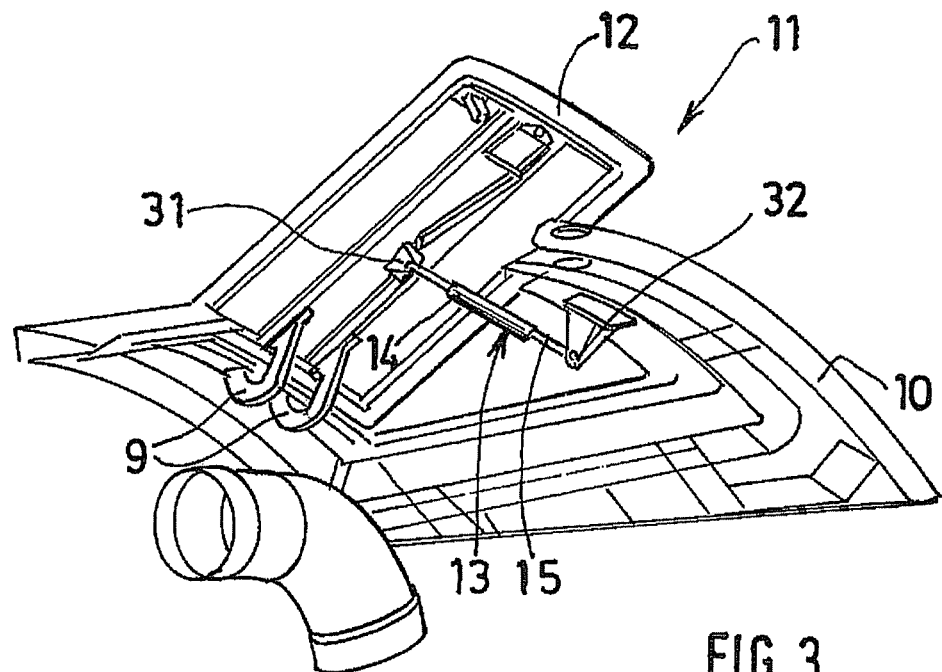

The inner structure 4 comprises an inner panel 10 which surrounds a downstream portion of the jet engine. As represented in FIGS. 2 and 3, exhaust means 11 are provided in this inner panel 10 so that any untimely excess pressure occurring in the jet engine compartment is discharged into the annular duct 3.

These exhaust means 11 are preferably positioned at the front of the inner panel 10 so as to be situated as close as possible to the sensitive regions in which excess pressure may occur due to an explosion in the jet engine compartment. These exhaust means 11 comprise at least one excess pressure flap 12 equipped with a strut 13. The excess pressure flap 12 is attached to the inner panel 10, and is pivotably mounted about the latter via a set of hinges 9.

Figure 4:
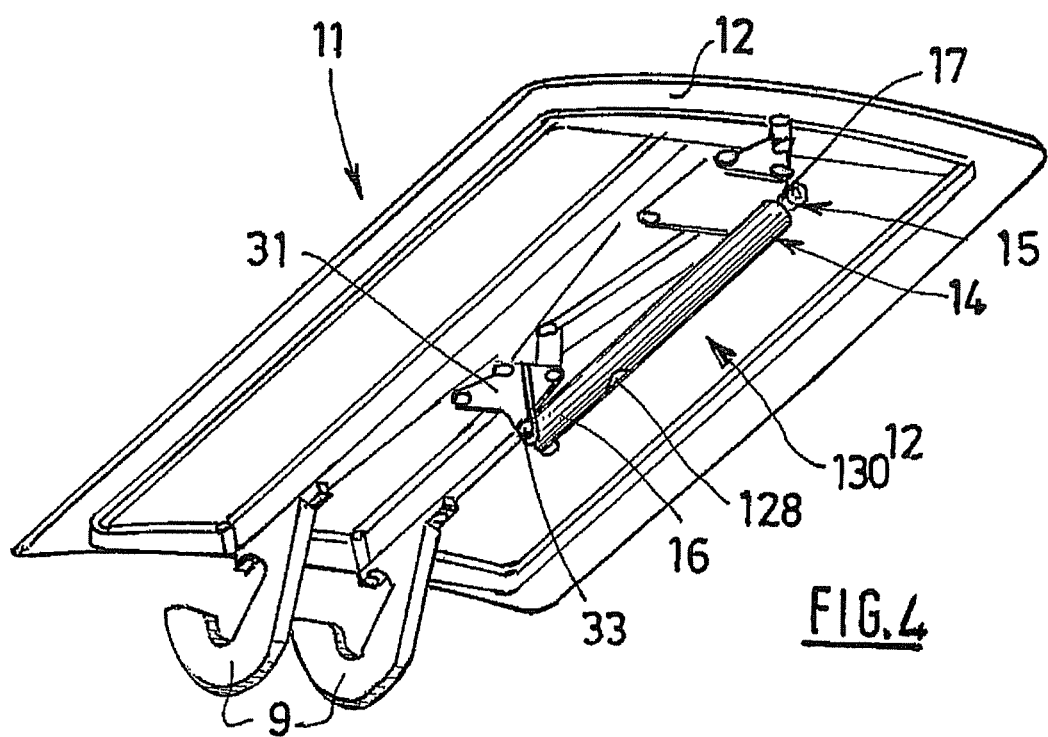
FIG. 4 is a perspective view of the excess pressure flap in an exemplary embodiment.
Figure 5:
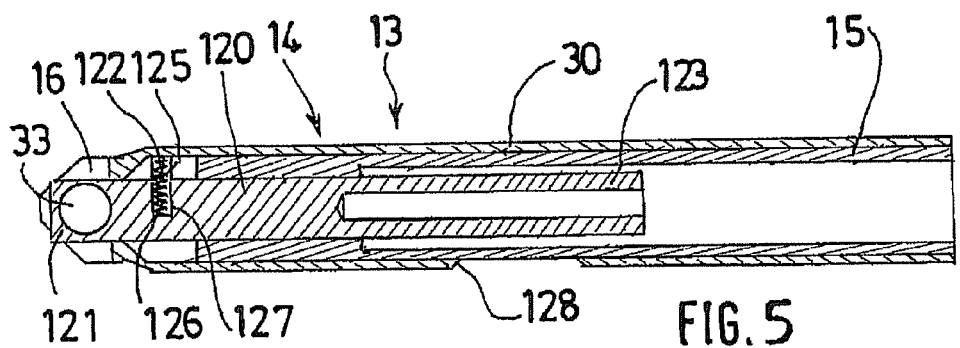
FIG. 5 is a partial view in longitudinal section of the strut, when at rest, of the excess pressure flap represented in FIG. 4.
Figure 6:
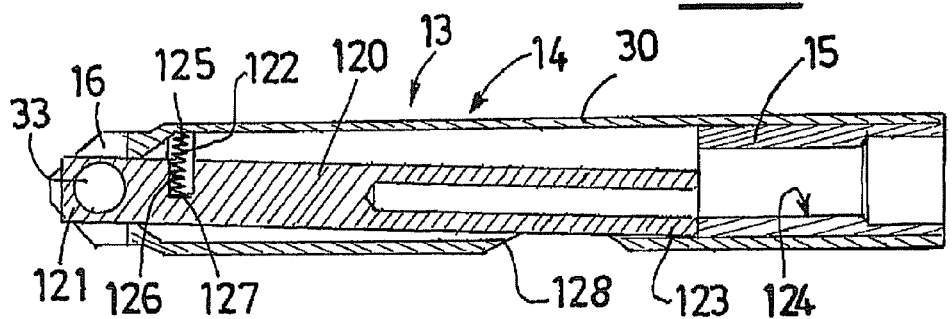
FIG. 6 is a partial view in longitudinal section of the strut, when deployed, of the excess pressure flap represented in FIG. 4.

A nacelle according to an exemplary embodiment is represented more specifically in FIGS. 4 to 6.

The strut 13 of the excess pressure flap 12 comprises a cylindrical hollow casing 14 in which a rod 15 can slide. This casing 14 has an end 16 pivotably mounted about an axis 33 in a fastening plate 31 attached to the excess pressure flap 12, and the rod 15, extending the casing 14, has an end 17 pivotably mounted in a fastening block 32 attached to the inner panel 10 of the inner structure 4.

More precisely, and as represented in FIGS. 5 and 6, a locking finger 120 is housed in the casing 14, and is arranged between the end 16 thereof and the rod 15.

More precisely, this locking finger 120 has a first end 121 pivotably mounted about the axis 33 in the region of the end 16 of the casing 14, and a second end 123 housed in a cavity 124 formed in the rod 15.

Furthermore, elastic return means are produced in the form of at least one compression spring 122. The latter is arranged transversely to the locking finger 120 in the region of the end 16 of the casing 14, and has a first end 125 bearing against the inner face of the lateral surface 30 of the casing 14, and a second end 126 housed in a transverse blind bore 127 formed in the locking finger 120.

In this way, when the excess pressure flap 12 is in the closed position in the continuation of the inner panel 10 of the inner structure 4, the casing 14, the locking finger 120 and the rod 15 are coaxial to one another.

On the other hand, in the event of untimely excess pressure in the jet engine compartment which is sufficient to cause the excess pressure flap 12 to open, the rod 15 is caused to slide in the casing 14 as represented in FIG. 11, and the second end 123 of the locking finger 120 is extracted from the cavity 124 of the rod 15 owing to the sliding of the latter into the deployed position. The compression spring 122 can then force the first end 121 of the locking finger 120 to pivot about said axis 33, the effect of which is to longitudinally off-center the locking finger 120 with respect to the cavity 124 of the rod 15. Said rod will therefore be locked in the case of rearward return since the second end 123 of the locking finger 120 will no longer be positioned opposite the cavity 124 presented by the rod 15.

Therefore, these locking means make it possible to lock the strut 13 in its spacing position which has been designed so as to ensure a minimum discharge flow rate to the outside in the event of untimely excess pressure.

It should be noted that the lateral surface 30 of the casing 14 may have an opening 128 which, during maintenance operations on the ground, makes it possible to reach the locking finger 120 and to force it to pivot about its axis 33 in order to arrange it parallel to the casing 14 and to the rod 15, thereby finally allowing a rearward return of the latter.

Moreover, detection means 129 are advantageously provided to allow the operator or operators to check instantaneously from the outside whether the exhaust means 11 have been actuated or not in flight.

Figure 7:
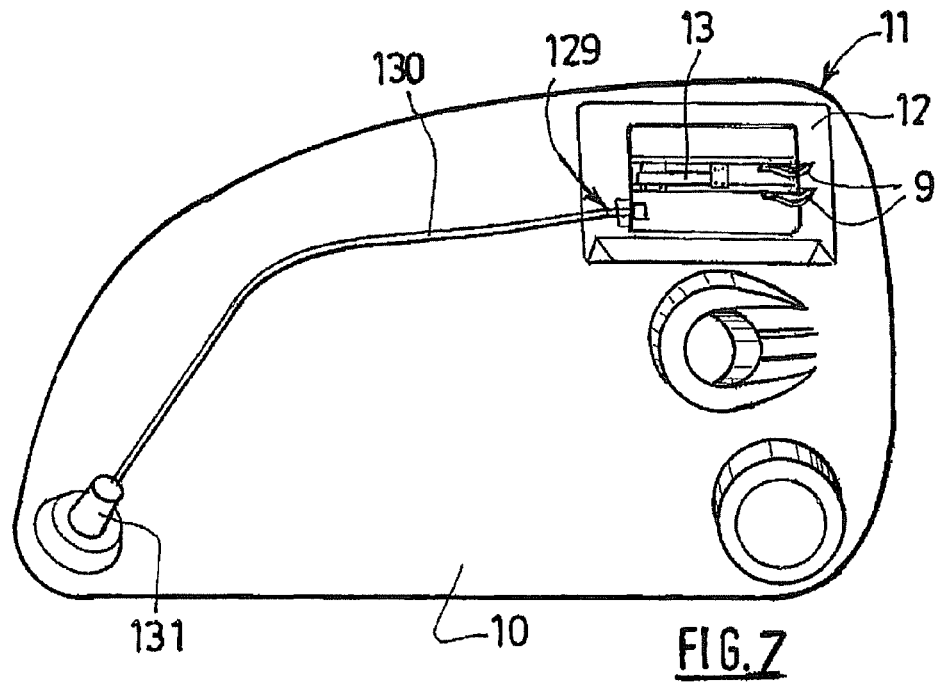
FIG. 7 is a partial schematic view of the nacelle represented in FIG. 2, equipped with detection means.

For that purpose, these detection means 129 comprise a control system whose activation is conditioned by the activation of the exhaust means 11 as represented schematically in FIG. 7.

This control system will advantageously comprise a cam whose pivoting will be controlled by the opening of the excess pressure flap 12. This cam will preferably be connected to a prestressed trigger which is connected to transmission means 130 attached to at least one external mechanical display member 131.

More precisely, the pivoting of the cam will cause the release of the prestress trigger, which as it is released will exert a pull on the transmission means advantageously produced in the form of a cable 130, this pull causing the deployment of the mechanical member preferably produced in the form of a "pop-out"-type device 131 as represented in the deployed position in FIG. 2.

Although the disclosure has been described in connection with specific exemplary embodiments, it goes without saying that it is in no way limited thereto and that it comprises all the technical equivalents of the means described as well as the combinations thereof if they come within the scope of the disclsoure.

The invention claimed is:

1. A nacelle for a jet engine, comprising:
a rear section made up of an outer structure which, together with a concentric inner structure including an inner panel intended to surround a downstream portion of the jet engine, defines an annular flow duct for a secondary stream:
exhaust means formed in the inner panel and comprising at least one excess pressure flap equipped with spacing means for guaranteeing a minimum discharge flow rate to an outside in an event of an untimely excess pressure, said spacing means being produced with aid of at least one strut equipped with locking means designed to lock said strut in the spacing position in the event of excess pressure requiring the opening of the excess pressure flap,
wherein the strut comprises a hollow casing in which a rod can slide, said casing having an end fixed in the excess pressure flap and said rod having an end fixed in the inner panel, and the locking means are produced with the aid of a locking finger housed in the casing and having a first end mounted pivotably about an axis in a region of the end of the casing and a second end housed in a cavity formed in the rod, and the locking means are produced with the aid of elastic return means designed so as to longitudinally off-center said locking finger with respect to the cavity of the rod when said rod has slid in the casing, thus preventing a rearward return.

2. The nacelle as claimed in claim 1, wherein the exhaust means are positioned at the front of the inner panel.

3. The nacelle as claimed in claim 1, wherein the nacelle comprises detection means designed so as to make the actuation of the exhaust means visible from the outside.

4. The nacelle as claimed in claim 3, wherein the detection means comprise a control system whose activation is conditioned by the activation of the exhaust means.

5. The nacelle as claimed in claim 4, wherein the control system is connected to at least one external mechanical display member via transmission means.

6. The nacelle as claimed in claim 5, wherein the control system comprises a pre-stress trigger, connected to the transmission means, the release of which is conditioned by the actuation of the exhaust means.

7. An aircraft employing at least one nacelle as claimed in claim 1.

* * * * *